US012687388B2

(12) United States Patent
Fumagalli et al.

(10) Patent No.: US 12,687,388 B2
(45) Date of Patent: Jul. 21, 2026

(54) METHOD AND DEVICE FOR MEASURING THE STRAIGHTNESS ERROR OF BARS AND TUBES

(71) Applicant: Q-TECH S.R.L., Flero (IT)

(72) Inventors: Luca Fumagalli, Flero (IT); Paolo Tomassini, Flero (IT); Erika Gregorelli, Flero (IT)

(73) Assignee: Q-TECH S.R.L., Flero (IT)

( * ) Notice: Subject to any disclaimer, the term of this patent is extended or adjusted under 35 U.S.C. 154(b) by 75 days.

(21) Appl. No.: 18/730,074

(22) PCT Filed: Jan. 16, 2023

(86) PCT No.: PCT/IB2023/050361
§ 371 (c)(1),
(2) Date: Jul. 18, 2024

(87) PCT Pub. No.: WO2023/139467
PCT Pub. Date: Jul. 27, 2023

(65) Prior Publication Data
US 2025/0146810 A1 May 8, 2025

(30) Foreign Application Priority Data
Jan. 18, 2022 (IT) ........................ 102022000000707

(51) Int. Cl.
*G01B 11/24* (2006.01)
(52) U.S. Cl.
CPC .................................... *G01B 11/24* (2013.01)
(58) Field of Classification Search
CPC ......... G01B 11/16; G01B 11/24; G01B 11/27; G01B 21/20; G01B 21/32
See application file for complete search history.

(56) References Cited

U.S. PATENT DOCUMENTS

| | | | |
|---|---|---|---|
| 2010/0088043 A1* | 4/2010 | Weiss | A01K 87/00 |
| | | | 702/56 |
| 2019/0120615 A1 | 4/2019 | Bomba | |
| 2020/0340805 A1 | 10/2020 | Fumagalli et al. | |

FOREIGN PATENT DOCUMENTS

| | | |
|---|---|---|
| CN | 109827538 A | 5/2019 |
| EP | 3637047 A1 | 4/2020 |
| JP | 2014-178182 A | 9/2014 |

OTHER PUBLICATIONS

WIPO, European International Search Authority, International Search Report and Written Opinion mailed Mar. 16, 2023 in International Patent Application No. PCT/IB2023/050361, 8 pages.

* cited by examiner

*Primary Examiner* — Kevin K Pyo
(74) *Attorney, Agent, or Firm* — MASUVALLEY & PARTNERS; Peter Martinez

(57) ABSTRACT

This invention relates to a device for measuring straightness errors of elements of elongated shape, such as bars, tubes and the like, comprising a bar supporting system having a plurality of supporting elements, a system for detecting the extension of the longitudinal axis of the bar and a control and data processing unit. Each supporting element (5) comprises a movable part (8) capable of translating at least in a transverse direction (T) with respect to the longitudinal axis of the bar, combined with first elastic means (11), in order to allow for complying with possible curvatures of the bar but, at the same time, keeping the bar within a defined measurement volume of the system for detecting the longitudinal extension of the bar.

15 Claims, 3 Drawing Sheets

METHOD AND DEVICE FOR MEASURING THE STRAIGHTNESS ERROR OF BARS AND TUBES

RELATED APPLICATIONS

This application is the U.S. National Phase of and claims priority to International Patent Application No. PCT/IB2023/050361, International Filing Date Jan. 16, 2023, entitled Method And Device For Measuring The Straightness Error Of Bars And Tubes; which claims benefit of and priority to Italy Application No. 102022000000707 filed Jan. 18, 2022 entitled Metodo e dispositivo di misura dell'errore di rettilineità di barre e tubi; both of which are incorporated herein by reference in their entireties.

FIELD OF THE INVENTION

The present invention refers in general to the sector of measuring devices and relates in particular to a method and a device for measuring straightness errors of elongated-shaped elements, such as typically rods, bars or tubes. Preferably, we refer to elements of metal materials and the measurement takes place during their production cycle.

STATE OF THE ART

In the sector of manufacturing bars, in particular of metal material, and more specifically in the sector of drawing of brass, aluminium and steel, methods are known for measuring the straightness of the finished product and for determining whether there is a straightness error of the product in the form of a bar and the like, also referred to as deflection. In other words, it is necessary to detect whether the bar in question has straightness errors, i.e. it is not straight but has one or more curvatures along its longitudinal axis, and to measure these errors to determine whether or not the bar complies with pre-set quality standards.

Since the current processing plants, e.g. in the brass sector, process spools at a speed of about 60-120 m/min and produce finished bars 3 to 5 m long with a frequency of one bar every 1-3 seconds, it is required that straightness measurement times are extremely short.

Over time, devices using optical sensors have been proposed for measuring the bar straightness.

Recently, measurement systems have also been proposed that use supports equipped with force sensors to detect the forces exchanged between the bar and the supporting structure, and use this information to correct the bar geometry detected by auxiliary systems, in particular by optical systems for measuring the shape of the bar.

However, these systems require force sensors to be installed at the supporting elements of the bar. Typically, load cells and/or other measuring sensors are used, which by their nature are extremely delicate and which must be arranged in positions in which they are subject to violent shocks and vibrations induced by the systems for loading the bars during the steps of depositing and collecting the bars on and from the supports. These sensors are, therefore, particularly prone to breakage. In addition, the datum they measure can be affected by the vibrations of the support and may not be accurate.

Furthermore, these solutions always have a very limited and restricted range of detectable forces and suffer from the fact that even a small curvature of the bar can cause large local stresses in a single support and even no stress at all in the adjacent support, depending on the actual geometry of the bar.

OBJECT AND SUMMARY OF THE INVENTION

The present invention was designed with the object of overcoming the drawbacks of the known art described above, by proposing a device and a respective method for accurately and simply detecting and measuring the straightness error of slender bodies once cut into bars, rods, tubes and the like of variable length, which can be used directly in production lines, e.g. drawing, rolling, extrusion, etc.

Another object is to propose a device and a method that are adapted to measure the straightness error of slender bodies having any geometric cross section, e.g. round or polygonal, solid or hollow, etc. and any length.

Another object is to propose a device and a method for measuring the straightness error of slender bodies, static during the measurement and, therefore, without having to rotate them on their longitudinal axis in order to be able to carry out the measurement.

A further object is to provide a device and method capable of compensating for the deformation of the slender body, which is generated by the weight of the same body.

These objects are achieved with a device for measuring straightness errors of slender bodies, such as bars, rods, tubes, etc., for the sake of simplicity called bars, according to claim 1.

Specifically, the measuring device comprises a supporting system having a plurality of supporting elements on which the bar rests, a system for detecting the extension of the longitudinal axis of the bar, comprising in turn one or more sensors, and a control and processing unit for calculating the possible straightness error of the bar, wherein the supporting elements comprise a portion that is movable at least in one direction transverse to the longitudinal direction of the bar and different from the vertical direction of the acceleration of gravity, with which first elastic means are combined, which act on each movable portion in the transverse direction and define a maximum travel of transverse displacement. Advantageously, the supporting system does not comprise any force sensor capable of measuring forces acting in the direction transverse to the vertical direction. This allows to have a more robust system, as it is devoid of sensors for measuring transverse forces which, by their nature and position in which they must be arranged in order to be able to measure such a force component, are very delicate and prone to breakage and wear.

Therefore, the bar rests on the support system and is freely arranged on the support elements, without the aid of any additional constraint element, which imposes its position and/or movement.

Preferably, the device does not comprise any force sensor, so it is even more robust.

Advantageously, the bar remains static during the measurement and, therefore, the measuring device does not comprise any means adapted to directly or indirectly cause a movement, in particular a rotation of the bar on its longitudinal axis, with respect to the supporting elements, during the straightness measurement.

Advantageously, the first elastic means comprise at least one pair of springs arranged on opposite sides of the movable portion so as to act on the bar in opposite directions, in order to limit the lateral displacement of each movable portion due to possible straightness errors of the bar and to dampen possible vibrations due to the settlement of the bar on the supporting system.

The first elastic means are configured to impose on each movable portion a position centred with respect to a nominal axis of the detecting system, when they are in an idle condition in which they are not stressed by the bar.

Preferably, second elastic means are also combined with the movable portions, the former acting in a vertical direction coinciding with the direction of the acceleration of gravity and allowing the translation of each movable portion in that direction as well. This configuration therefore allows movable portions to be displaced both transversely and vertically in order to comply with the bar geometry being measured from time to time, thus allowing the actual bar geometry to be detected without possible deformations imposed by stiff and fixed supporting elements. In addition, the elastic means allow movable portions to be displaced, while reducing the vibrations that such a movement could cause if the movable portions were free in their movement.

The second elastic means may also comprise one or more springs capable of supporting both the weight of the respective movable portion and the possible portion of the force exerted by the bar on the movable portion. In a preferred solution, the supporting elements comprise four vertical sliding columns, each arranged concentrically to a respective spring.

Advantageously, at least one force sensor for detecting the force exerted by the bar in the vertical direction is combined with each supporting element, so that the weight force exerted by the bar on each supporting element can be detected and taken into account when determining the straightness of the bar.

In a particularly preferred solution, the detecting system comprises one or more optical-type sensors arranged parallel to the bar along its longitudinal direction, capable of detecting the geometry of at least one portion of the bar arranged inside a measurement volume next to at least three different sections of the same bar. Each optical sensor can be mounted either fixed or sliding parallel to the longitudinal direction of the bar.

Advantageously, the first and possible second elastic means passively guide the bar, by complying with possible curvatures in its profile but keeping it within the measurement volume of the detecting system.

Advantageously, therefore, the supporting elements, which act as constraints at the position itself of the bar, are structured to comply with possible curvatures of the bar in different planes and, in particular, in both a horizontal and a vertical plane, thus improving the distribution of the weight of the bar on each supporting element, ensuring that the supporting surfaces of all supporting elements are in contact with the bar and allowing natural balancing of the transverse forces transmitted to each supporting element. This action further allows the bar to be centred inside the measurement volume of the system for detecting the longitudinal extension of the bar axis. In fact, the elastic means allow the bar to be arranged depending on its possible curvatures but are dimensioned to ensure that the bar remains within a certain range, in particular in a horizontal direction transverse to the direction of the longitudinal extension of the bar, in order to allow correct detection by the sensors for measuring the bar extension.

Advantageously, therefore, the control and processing unit of the system is capable of mathematically deriving the actual geometry of the bar from the resulting geometric extension of the longitudinal axis of the bar only, as measured by the detecting system described above. Thanks to this configuration, the system is such that it does not require any controlled movement of the supports nor the adoption of specific sensors for measuring forces and/or transverse displacements, thus being extremely robust and suitable for applications in industrial field.

The invention also relates to a measuring method according to claim 10, for measuring straightness errors of bars. Such a method involves statically positioning a bar on a supporting system provided with surfaces which are movable at least in a transverse direction, in a manner controlled by elastic means combined therewith, to comply with the geometry of the bar; detecting, by means of a system for detecting the bar geometry, the coordinates of a plurality of points of the bar surface next to at least three cross sections thereof; calculating the coordinates of the longitudinal axis of the bar at these cross sections; and mathematically determining the possible straightness error of the bar, depending on the data detected by the system for detecting the bar geometry and without using any possible measurement of forces acting in a direction transverse to the direction of the acceleration of gravity. Advantageously, the bar remains static during the measurement, since the method does not provide any step for causing, directly or indirectly, a movement, in particular a rotation, of the bar with respect to the supporting elements, to carry out measurements at different sections of the bar.

Preferably, the movable portion is susceptible to displacements even in a vertical direction, in a controlled manner by second elastic means.

Advantageously, the displacements of the movable portions in transverse and possibly vertical direction allow the supporting elements to comply with the bar geometry so that its straightness and/or its curvatures can be calculated from the detection of the bar geometry only.

Preferably, the measuring method provides for carrying out a measurement only through the detecting system of the extension of the longitudinal axis of the bar.

Alternatively, the measuring device comprises at least one force sensor combined with each supporting element to detect the force exerted by the bar in the vertical direction and the method provides for detecting the force exerted by the bar on the supporting elements in the vertical direction and for mathematically determining the possible straightness error of the bar, depending on the data detected by the system for detecting bar geometry and on the force exerted by the bar in the vertical direction and detected by each force sensor.

Advantageously, the method provides for acquiring the coordinates of a plurality of points of the bar surface, in each of at least three sections along the longitudinal axis of the bar; carrying out a least squares interpolation of the coordinates of the points with a reference model of the bar section to determine the coordinates of the centre of each cross section, i.e. the position of the axis of the bar in the at least three cross sections; and calculating the straightness error as the distance between two parallel lines, one passing through the centres of two cross sections and one passing through the centre of a third cross section, intermediate to the preceding two centres.

Preferably, the data related to the straightness error, from time to time detected on the bars, are sent to a plant manufacturing bars to feedback adjust the production parameters, so that the bars may be classified depending on the magnitude of the measured straightness error and possibly unloaded from the supporting system on different lines depending on the magnitude of the error.

BRIEF DESCRIPTION OF THE DRAWINGS

The invention will, however, be further depicted in the following description made with reference to the accompanying illustrative and non-limiting drawings, wherein.

DETAILED DESCRIPTION OF THE INVENTION

In said drawings, 1 globally denotes a measuring device for measuring straightness errors E of an elongated element such as a bar, rod, tube and the like, hereinafter referred to simply as bar 2. The bar can have a section with any geometry, e.g. circular, hexagonal, square, etc., any dimensions and can be made of any material, preferably metal.

Figures 1, 2:
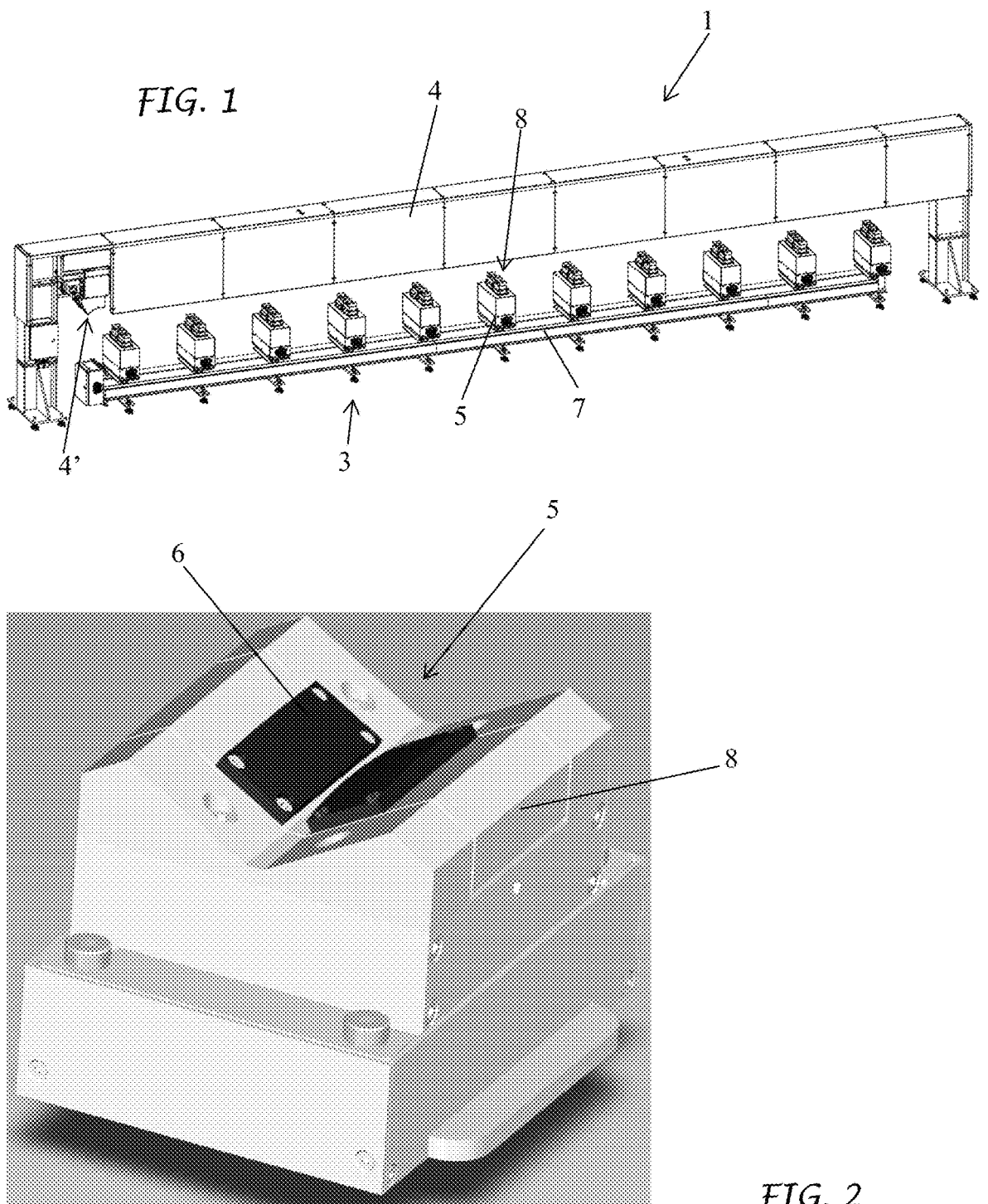
FIG. 1 shows a perspective view of an embodiment of the measuring device according to the invention, comprising a supporting system to support a bar.
FIG. 2 shows a perspective view of a supporting element of the supporting system of FIG. 1.

As shown schematically in FIG. 1, the measuring device 1 comprises a supporting system 3 to support the bar during the measurement, a detecting system 4 to detect the extension of the longitudinal axis of the bar 2 and a control and processing unit—not shown—capable of processing the data acquired by said detecting system.

The detecting system 4 comprises one or more sensors 4', preferably optical sensors, for detecting the three-dimensional geometry of the bar being measured. These sensors may be positioned in a fixed geometric configuration with respect to the bar supporting system or in a mobile configuration so as to translate parallel to the longitudinal axis of the bar. Preferably, the detecting means are arranged above the bar and are adapted to detect the geometry of an object arranged within a measurement volume MV.

The supporting system 3 comprises a plurality of supporting elements 5 to support the bar to be measured, each having a supporting surface 6 of the bar. The supporting elements can be mounted on a rail 7 in order to allow their correct positioning and spacing, depending on the type and dimension of the bar to be measured.

Figure 3:
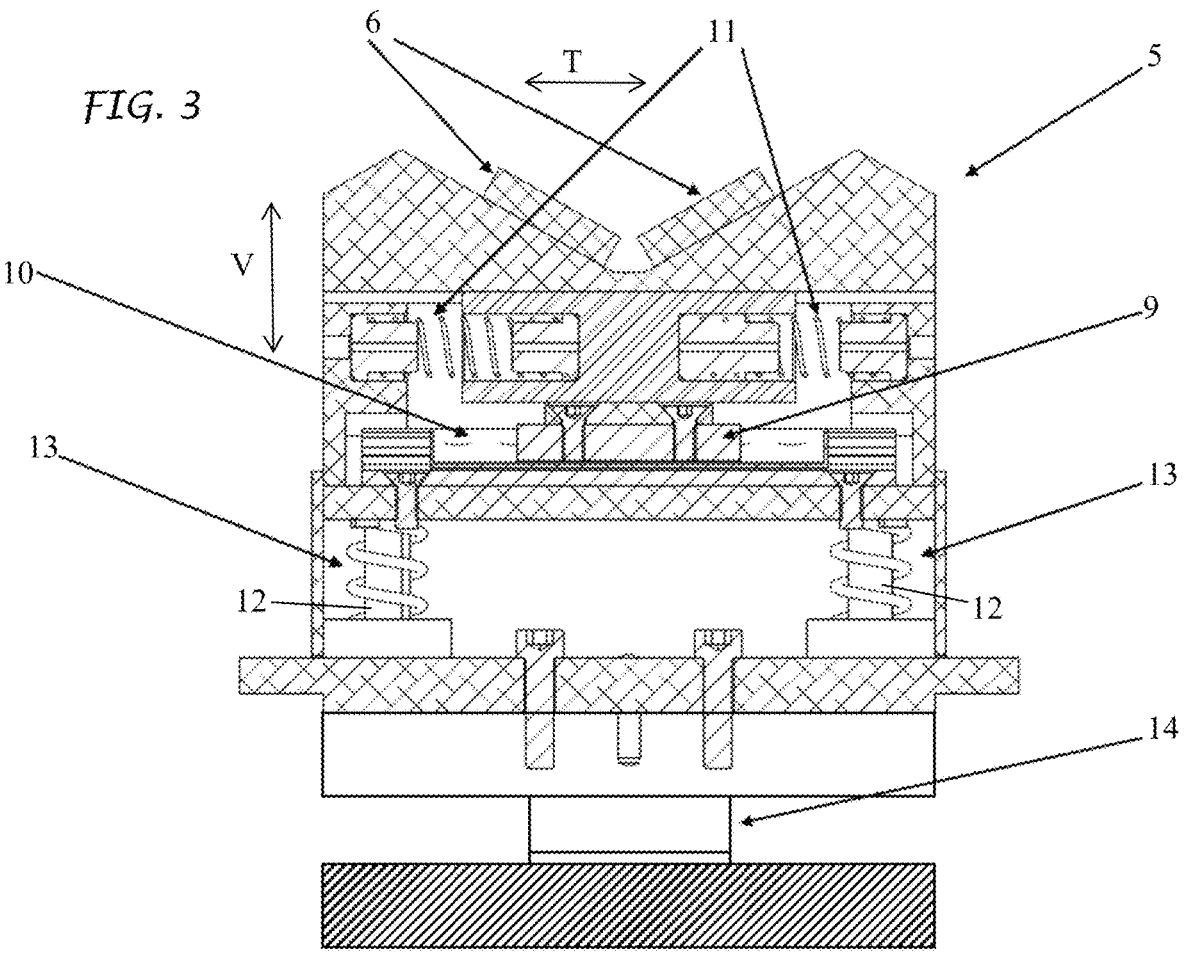
FIG. 3 shows a sectional view of the supporting element of FIG. 2.
Figure 4:
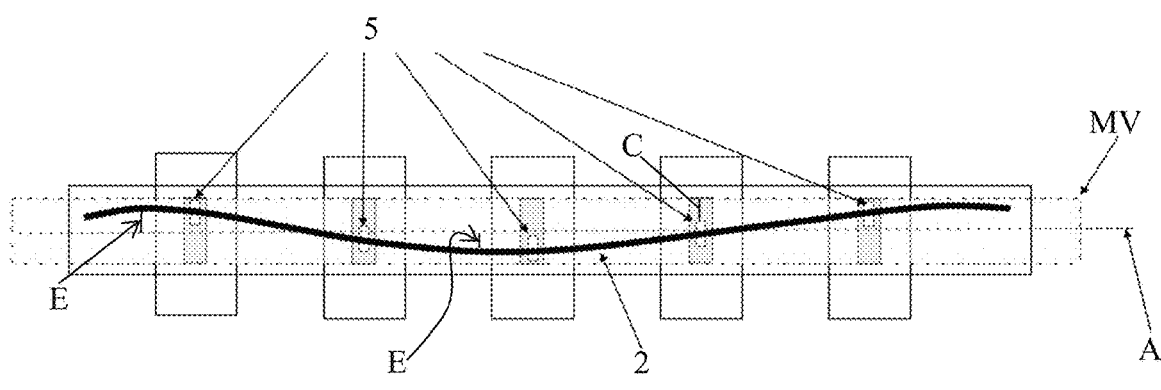
FIG. 4 shows a top view of a bar arranged on the supporting system of FIG. 1.

Each supporting element 5 comprises a movable portion 8 capable of translating in a transverse direction T with respect to the longitudinal axis of the bar, when pushed by the same bar, to comply with a possible non-straightness. As can be seen by the arrows in FIG. 3, the transverse direction T is also transverse to the vertical direction of the acceleration of gravity. Preferably, the movable part is arranged on a movable carriage 9 mounted slidingly in a linear sliding guide 10, to allow it to be moved in the transverse direction. First elastic means 11 are combined with the movable portion, in particular a pair of compressed springs which act in transverse direction, in opposite directions with respect to each other. The first elastic means impose, on the respective movable portion, a position centred with respect to the nominal axis A of the detecting system 4 for detecting the extension of the longitudinal axis of the bar, in an idle condition in which they are not stressed by the bar.

Each movable portion 8 may also translate in a vertical direction V coinciding with the direction of the acceleration of gravity, driven by one or more vertical sliding columns 12. For this purpose, second elastic means 13 are combined with the sliding columns, in particular one or more compressed springs which are sized to support the weight of the movable portion and of the possible portion of force exerted by the bar on the movable portion. Preferably, each supporting element comprises four sliding columns, each arranged concentrically to a respective spring.

Such a configuration makes the supporting system self-centring, as the combined action of the supporting elements allows the bar to be guided passively so as to comply with its natural profile but, at the same time, it allows it to be kept within the measurement volume MV of the system for detecting the longitudinal extension of the bar, thus ensuring a natural balancing of forces both in a direction parallel to the force of gravity and in a direction transverse thereto, in particular in a direction orthogonal to the axis of the same bar. Therefore, the elastic means not only help to dampen the vibrations of the bar when it is positioned on the supporting system, but they define a maximum travel C of the displacement that each movable portion can make with respect to the nominal axis A to ensure that the bar always remains within the measurement volume MV.

In a particularly preferred solution, each supporting element 5 is combined with at least one respective force sensor 14 capable of detecting the force exerted by the bar in the vertical direction V. Thereby, the contribution of the force acting on each supporting element in the direction of the acceleration of gravity could be used in conjunction with the data detected by the detecting system 4 in order to improve the measure, by mathematically determining possible residual deformation caused by the weight force of the bar.

Advantageously, thanks to such a system of supporting elements, the equilibrium position achieved by the bar is such that the weight of the bar is automatically distributed in a balanced manner among all the supporting elements and the distribution of transverse forces among the various supporting elements is automatically optimised.

Advantageously, this balancing also allows to avoid dangerous local distortions in the geometry of the bar to be established, which are caused by the possible exceeding of the elastic deformation regime of the same material, a potentially significant risk in traditional systems characterised by fixed supporting elements.

Advantageously, the supporting system further allows to cushion and dampen possible shocks and/or vibrations caused by the system for loading the bars, thus making it highly effective and reliable in the industrial field. In addition, such a supporting system is particularly robust as it preferably does not comprise delicate elements, such as force sensors and the like.

Preferably, the system for detecting the extension of the longitudinal axis of the bar acquires the coordinates of a plurality of points of the surface of the bar next to at least three cross sections of the same bar and the control and processing unit is programmed to calculate the position of the effective geometric centre of each section, detected from the coordinates of the aforesaid points, to verify the straightness or otherwise of the bar axis, possibly taking into account possible further deformations caused by the weight force of the bar and determined mathematically from the vertical forces. When acquiring the coordinates of the one plurality of points of the bar surface, the bar is stationary on the supporting system. In other words, it is not expected and there is no need to rotate the bar while detecting the extension of its longitudinal axis.

Figure 5:
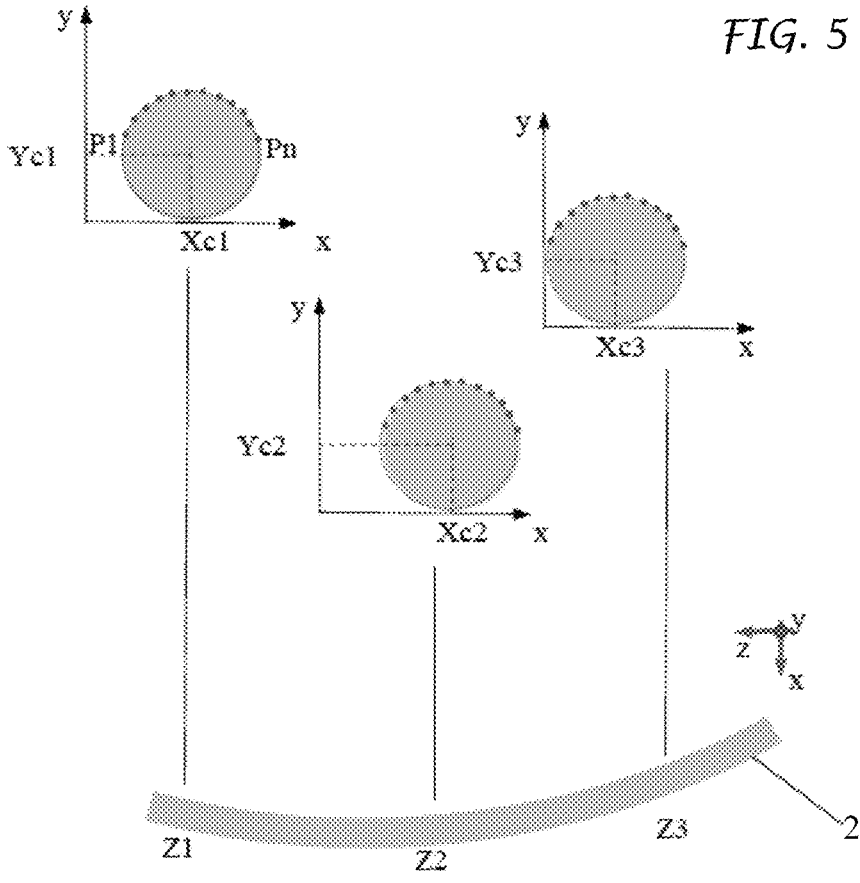
FIG. 5 shows an example of a first step of calculating the straightness error.

Specifically, the coordinates of the centres C1, C2, . . . , Cn in the X-Z plane of FIG. 5 can be used to determine the maximum deviation of the effective coordinates of the centres with respect to a line interpolating to the least squares, which is defined by all the same centres evaluated over the entire length of the bar or on only one or more portions of the bar of interest, in order to determine local non-straightness, as required by some industry regulations.

However, different modes can be used to calculate the straightness error E; e.g., this error can be determined by interpolating the centres to a theoretical circle arc and then determining some invariants of this arc, such as e.g. the maximum deflection normalised to the bar length, or to the square of the bar length, as is the practice in certain application sectors, such as the sector of brass bars.

Once the cycle of calculating the possible bar straightness error is complete, the central control unit is programmed to classify the bars depending on the magnitude of this error and possibly unload them from the supporting system on different routing lines depending on pre-set error thresholds.

Advantageously, in the calculation step depicted above, the data acquisition and processing module is able to determine the extension of the longitudinal axis of the bar, starting from the coordinates detected for the multiplicity of measuring points P1, P2, . . . . Pn acquired at each measurement section Z1, Z2, . . . . Zn, longitudinal to the bar; these points are used to carry out a least-squares interpolation with a reference model of the bar section, a circumference in the example depicted, and thus determining its Xc, Yc coordinates of the centre C1, C2, . . . , Cn of each cross section. The number of sections that are used may range from a minimum of three sections to a higher number to improve measurement accuracy, consistent with the available measurement times, depending on the frequency of manufacturing the bars.

Figure 6:
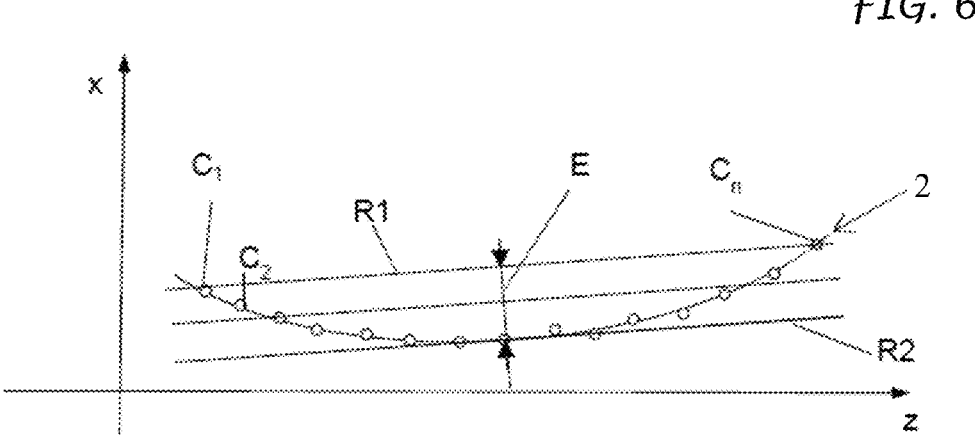
FIG. 6 shows an example of a second step of calculating the straightness error.

FIG. 6 shows an example of positions of the centres C1, C2, . . . , Cn of the cross sections detected in a Cartesian X, Z reference system combined with the supporting system. In particular, a mode of error calculation is shown, which provides for calculating the straightness error E as the distance between two parallel lines, of which a first line $R_1$ passing through the centres of two cross sections, and a second line $R_2$ passing through the centre of a third cross section, intermediate to the previous two centres.

Advantageously, this method can be applied for the determination of the development of the longitudinal axis of the bar even in the presence of bars with cross sections of complex geometry and, in any case, different from the circular one.

The invention claimed is:

1. A measuring device (1) for measuring straightness errors (E) of elements of elongated shape defined bars (2), which comprises a supporting system (3) on which the bar to be measured settles, a detecting system (4) for detecting an extension of a longitudinal axis of the bar, comprising in turn one or more sensors (4') for detecting a geometry of the bar being measured and a control and processing unit for calculating possible straightness errors of the bar, wherein said bar supporting system comprises a plurality of supporting elements (5), on which the bar to be measured is statically arranged, and is characterised in that each supporting element (5) comprises a movable portion (8) which is capable of translating at least in a transverse direction (T) with respect to the longitudinal axis of the bar, said transverse direction (T) not coinciding with a vertical direction (V), in that said movable portion (8) is combined with first elastic means (11) acting on said movable portion in said transverse direction (T) and in that the supporting system is devoid of force sensors for measuring forces which act in a direction transverse to the direction of an acceleration of gravity.

2. The measuring device (1) according to claim 1, wherein the supporting system is configured to keep the bar static during the measurement, as no means are provided for causing, directly or indirectly, a movement of the bar with respect to the supporting elements.

3. The measuring device (1) according to claim 1, wherein the first elastic means (11) comprise at least one pair of springs which act in opposite directions with respect to each other.

4. The measuring device (1) according to claim 1, wherein the device comprises a nominal axis (A) and wherein the first elastic means impose, on the respective movable portion, a position centred with respect to the nominal axis (A) of the detecting system (4) of the extension of the longitudinal axis of the bar, in an idle condition in which they are not stressed by the bar.

5. The measuring device (1) according to claim 1, wherein each movable portion (8) is also movable in a vertical direction (V) coinciding with the direction of the acceleration of gravity and is combined with second elastic means (13) acting on said movable portion in said vertical direction (V).

6. The measuring device (1) according to claim 5, wherein said second elastic means (13) comprise one or more springs sized to support a weight of the movable portion and of the possible portion of force exerted by the bar on the movable portion, said supporting elements (5) being able to comprise four sliding columns (12) each arranged concentrically to a respective spring.

7. The measuring device (1) according to claim 1, wherein at least one force sensor (14) adapted to detect the force exerted by the bar in the vertical direction (V), is combined with each supporting element (5).

8. The measuring device (1) according to claim 1, wherein said one or more sensors (4') of the detecting system (4) are optical sensors, wherein the detecting system comprises:
    at least one optical sensor (4') and means for positioning it next to at least three different sections of the supporting system (3), along its longitudinal axis; or
    at least three stationary optical sensors (4') each arranged at a different section of the supporting system, along its longitudinal axis;
    and wherein the detecting system is adapted to detect the geometry of a bar arranged within a measurement volume (MV).

9. The measuring device (1) according to claim 8, wherein said first elastic means (11) and a second elastic means (13), if present, are dimensioned to passively guide the bar so as to comply with its profile, keeping it inside the measurement volume (MV) of the detecting system.

10. Method A method for measuring straightness errors of elements of elongated shape, called bars (2), by means of a measuring device (1) comprising a supporting system (3), on which the bar to be measured settles, a detecting system (4) for detecting an extension of a longitudinal axis of the bar, provided with one or more optical sensors (4'), a control and processing unit receiving data detected by said one or more sensors and provided with program means for processing said data and calculating any errors of straightness (E) of the bar, wherein said supporting system (3) comprises a plurality of supporting elements (5), each of which comprises a movable portion (8) capable of translating at least in a transverse direction (T) with respect to the longitudinal axis of the bar, said transverse direction (T) not coinciding with a vertical direction (V), wherein said movable portion is combined with first elastic means (11) acting in said transverse direction (T), the method comprising the steps of:

a) positioning a bar on the supporting system so that it settles in a static equilibrium position;

b) detecting, by means of the detecting system (4), coordinates of a plurality of points (P1, P2, . . . , Pn) of a surface of the bar next to at least three of its cross sections (Z1, Z2, . . . , Zn);

c) calculating the coordinates of the longitudinal axis of the bar at said at least three cross sections, on the basis of the detection in step b); and d) mathematically determining a possible error of straightness (E) of the bar, on the basis of the data detected by said system for detecting a geometry of the bar;

wherein during step b) the movable portion (8) of each supporting element (5) can translate at least in said transverse direction (T) being pushed by the same bar, up to a maximum travel (C) determined by said first elastic means (11) and wherein the method does not provide for measuring forces acting in a direction transverse to the direction of an acceleration of gravity.

11. The measuring method according to claim 10, wherein the bar is kept static during the measurement, since no movement step is provided to cause, directly or indirectly, a movement of the bar with respect to the supporting elements (5).

12. The measuring method according to claim 10, wherein said movable portion (8) is combined with second elastic means (13) so as to be able to translate even in a vertical direction (V) coinciding with the direction of the acceleration of gravity and wherein, during step b), the movable portion (8) of each supporting element (5) can translate at least in said vertical direction (V) being pushed by the same bar.

13. The measuring method according to claim 10, wherein the method substantially provides for a single measuring step carried out only by means of the detecting system (4) for detecting the extension of the longitudinal axis of the bar.

14. The measuring method according to claim 10, wherein the measuring device (1) comprises at least one force sensor combined with each supporting element (5), wherein said at least one force sensor (14) is adapted to detect the force exerted by the bar in the vertical direction (V) and wherein the method comprises the further step of b) detecting, by means of said at least one force sensor, the force exerted by the bar on the respective supporting element (5) in the vertical direction (V) and wherein step d) provides for mathematically determining the possible straightness error (E) of the bar, on the basis of the data detected by means of said system for detecting the geometry of the bar and by means of the data detected by each force sensor for detecting the force in the vertical direction (V).

15. The measuring device (1) according to claim 5, wherein each movable portion (8) driven by one or more vertical sliding columns (12), is susceptible to translations in the vertical direction.

* * * * *